(12) United States Patent
Igura

(10) Patent No.: US 9,692,466 B2
(45) Date of Patent: Jun. 27, 2017

(54) RADIO RECEPTION CIRCUIT, RADIO RECEPTION METHOD, AND RADIO RECEPTION PROGRAM

(71) Applicant: NEC Corporation, Minato-ku, Tokyo (JP)

(72) Inventor: Hiroyuki Igura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/904,168

(22) PCT Filed: Jul. 16, 2014

(86) PCT No.: PCT/JP2014/068950
§ 371 (c)(1),
(2) Date: Jan. 11, 2016

(87) PCT Pub. No.: WO2015/008802
PCT Pub. Date: Jan. 22, 2015

(65) Prior Publication Data
US 2016/0149603 A1    May 26, 2016

(30) Foreign Application Priority Data

Jul. 16, 2013   (JP) .................................. 2013-147238

(51) Int. Cl.
*H04B 1/10*   (2006.01)
*H04B 17/29*   (2015.01)
*H04B 17/336*   (2015.01)

(52) U.S. Cl.
CPC ........... *H04B 1/1027* (2013.01); *H04B 17/29* (2015.01); *H04B 17/336* (2015.01); *H04B 2001/1054* (2013.01)

(58) Field of Classification Search
CPC ... H04B 1/1027; H04B 1/1036; H04B 17/318
(Continued)

(56) References Cited

U.S. PATENT DOCUMENTS

| 4,907,293 A | 3/1990 | Ueno |
| 7,272,374 B2 | 9/2007 | Tuttle et al. |

(Continued)

FOREIGN PATENT DOCUMENTS

| JP | 63-269613 A | 11/1988 |
| JP | 2003-283255 A | 10/2003 |

(Continued)

OTHER PUBLICATIONS

International Search Report for PCT Application No. PCT/JP2014/068950, mailed on Aug. 12, 2014.

*Primary Examiner* — Sonny Trinh

(57) ABSTRACT

A radio reception circuit that allows for preventing the S/N ratio from being degraded due to the spurious of high-output adjacent channel signals, comprises: a variable bandpass filter for passing one of received signals that has a particular frequency and that is of a particular bandwidth; a demodulation circuit for demodulating the received signal having passed through the variable bandpass filter, thereby outputting an ultimate output signal; a frequency characteristic table that stores a plurality of different parameters about frequencies and bandwidths in advance; an S/N ratio measurement circuit for calculating the S/N ratio of the output signal in a case where one of the plurality of different parameters is applied to the variable bandpass filter; and a control unit for setting, to the variable bandpass filter, a parameter, for which the best S/N ratio can be obtained, out of the plurality of different parameters.

9 Claims, 13 Drawing Sheets

(58) Field of Classification Search
USPC ............... 455/307, 334, 67.13, 501, 135
See application file for complete search history.

(56) References Cited

U.S. PATENT DOCUMENTS

| | | | |
|---|---|---|---|
| 7,522,896 B2 * | 4/2009 | Oshima | H04B 1/1027 455/136 |
| 2002/0004377 A1 * | 1/2002 | Snygg | H04B 1/1036 455/339 |
| 2008/0076374 A1 * | 3/2008 | Grenader | H04B 1/1027 455/307 |
| 2009/0156145 A1 | 6/2009 | Lindstrom et al. | |

FOREIGN PATENT DOCUMENTS

| | | |
|---|---|---|
| JP | 2006-109207 A | 4/2006 |
| JP | 2006-262088 A | 9/2006 |
| JP | 2006-319537 A | 11/2006 |
| JP | 2008-079242 A | 4/2008 |
| JP | 2009-512273 A | 3/2009 |
| JP | 4456635 B | 4/2010 |
| JP | 2010-220146 A | 9/2010 |
| JP | 2011-193079 A | 9/2011 |

* cited by examiner

FIG. 4A NORMALIZED POWER SPECTRUM
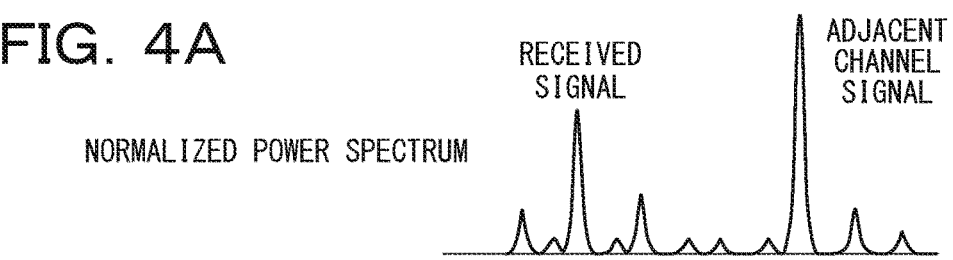
RECEIVED SIGNAL
ADJACENT CHANNEL SIGNAL
×
FIG. 4B NARROW BAND FILTER CHARACTERISTIC DATA
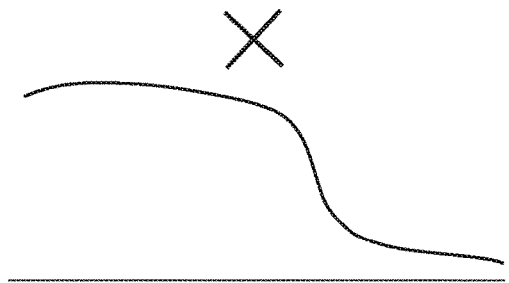
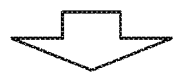
FIG. 4C VIRTUAL POWER SPECTRUM
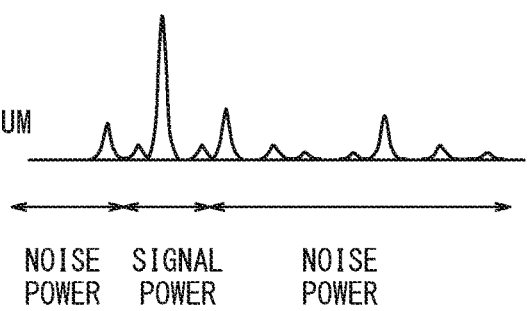
NOISE POWER    SIGNAL POWER    NOISE POWER

RADIO RECEPTION CIRCUIT, RADIO RECEPTION METHOD, AND RADIO RECEPTION PROGRAM

This application is a National Stage Entry of PCT/JP2014/068950 filed on Jul. 16, 2014, which claims priority from Japanese Patent Application 2013-147238 filed on Jul. 16, 2013, the contents of all of which are incorporated herein by reference, in their entirety.

TECHNICAL FIELD

The present invention relates to a radio reception circuit, a radio reception method, and a radio reception program and, more specifically, to a radio reception circuit and the like capable of preventing deterioration in the S/N ratio caused by the influence of adjacent channel signals.

BACKGROUND ART

In radio receivers particularly used in digital radio communication, normally, processing such as demodulation is performed on RF (Radio Frequency) signals received at an antenna after converting those signals into signals of low frequency such as intermediate frequency signals or baseband signals. In such case, it is common to employ a method with which: the RF signals are let through a bandpass filter (BPF) to extract signals of a wider band than the band of the received signals; the extracted signals are converted into the intermediate frequency signals or the baseband signals; and further a necessary frequency component is extracted therefrom.

FIG. 9 is an explanatory chart showing the structures of a super heterodyne type radio reception circuit 910 used in an existing radio receiver. The reception circuit 910 first includes: a first bandpass filter 911 (BPF) which passes a particular frequency and a particular bandwidth from RF signals inputted from an antenna 910b; a low-noise amplifier 912 which amplifies output signals from the first bandpass filter 911; a mixer circuit 913 which converts the amplified output signals to intermediate frequency signals; and a local oscillator 914 which supplies local oscillation signals to the mixer circuit 913.

The reception circuit 910 further includes: a second bandpass filter 915 (BPF) which passes a particular frequency and a particular bandwidth further from the intermediate frequency signals outputted from the mixer circuit 913; an A/D converter 916 which performs A/D conversion on the output signals from the second bandpass filter 915; a quadrature demodulation circuit 917 which performs quadrature demodulation on the A/D-converted signals; and a numerical value control oscillator 918 which supplies oscillation signals for operations to the quadrature demodulation circuit 917.

Further, the reception circuit 910 includes: a low-pass filter 919 (LPF) which passes a low frequency side of the output from the quadrature demodulation circuit 917; and a demodulation circuit 920 which demodulates the output signal from the low-pass filter 919 to have an ultimate output signal.

The super heterodyne type reception circuit 910 is in a structure which acquires the intermediate frequency signal from the RF signal by the mixer circuit 913 as described above. Thus, interference occurs when a signal (image signal) of a frequency that is at a symmetric position with respect to a target frequency by sandwiching the oscillation frequency of the local oscillator 914 therebetween is mixed into the input signal of the mixer circuit 913, and it cannot be eliminated at a later stage.

Therefore, it is necessary to eliminate the image signal at the first bandpass filter 911 that is the previous stage of the mixer circuit 913, and the first bandpass filter 911 is required to have a high performance.

FIG. 10 is an explanatory chart showing the structures of a direct conversion type reception circuit 930 that is used in an existing radio receiver. The reception circuit 930 first includes: a bandpass filter 931 (BPF) which passes a particular frequency and a particular bandwidth from RF signals inputted from an antenna; a low-noise amplifier 932 which amplifies output signals from the bandpass filter 931; a quadrature demodulation circuit 933 which converts the amplified output signals to baseband signals; and a local oscillator 934 which supplies local oscillation signals to the quadrature demodulation circuit 933.

The reception circuit 930 further includes: a first low-pass filter 935 (LPF) which passes a low frequency side of the baseband signals outputted from the quadrature demodulation circuit 933; an A/D converter 936 which performs A/D conversion on the output signals from the first low-pass filter 935; a second low-pass filter 937 (LPF) which passes a low frequency side of the output signals from the A/D converter 936; and a demodulation circuit 938 which demodulates the output signal from the second low-pass filter 937 to have an ultimate output signal.

The reception circuit 930 that is the direct conversion type is a structure which converts the signals to the baseband signals not by the super heterodyne type mixer circuit but by the quadrature demodulation circuit 933 as described above. Thus, even if there is an image signal, such signal can be separated by a filter or the like of a later stage. Therefore, compared to the case of the super heterodyne type, not so high performance is required for the bandpass filter 931 of a previous stage.

However, the reception circuit 930 that is the direct conversion type directly converts the RF signal into the baseband signal by the quadrature demodulation circuit 933. Therefore, there are such known issues that DC offset tends to occur, the influence of 1/f noise is likely to be imposed, etc.

FIG. 11 is an explanatory chart showing the structures of a reception circuit 940 that is acquired by partially refining the reception circuit 930 shown in FIG. 10. The reception circuit 940 is a structure acquired by adding a frequency conversion circuit 941 which converts the output signal of an intermediate frequency outputted from the A/D converter 936 to the baseband signal and a numerical value control oscillator 942 which supplies an oscillation signal for operation to the frequency conversion circuit 941 between the A/D converter 936 and the second low-pass filter 937 (LPF) of the reception circuit 930.

The reception circuit 940 performs conversion to the intermediate frequency by using the frequency conversion circuit 941, so that it is easy to eliminate the DC offset, the 1/f noise, and the like.

However, there is such an issue with the cases of any of the reception circuit 910, 930, and 940 of the super heterodyne type and the direct conversion type shown heretofore that the S/N ratio is decreased relatively due to the signal component (spurious) and that the reception sensitivity becomes deteriorated in a case where there are strong signals in the vicinity of the target frequency and such signals cannot be eliminated by the bandpass filter 911 or 931 in the previous stage.

FIG. 12 is an explanatory chart showing a flow of signal conversion in the super heterodyne type reception circuit 910 shown in FIG. 9. FIG. 12A shows the frequency characteristic of the output signal at a stage of output from the first bandpass filter 911, FIG. 12B shows that of a stage of output from the mixer circuit 913, and FIG. 12C shows that of a stage of output from the low-pass filter 917, respectively.

Normally, to be able to deal with a plurality of radio channels, the passband of the first bandpass filter 911 is set to be wider than the bandwidth of the actual receiving signals. Further, the image signals are mixed with the received signals by the mixing processing done by the mixer circuit 913, and it becomes difficult to eliminate those in the latter processing. Thus, the oscillation frequency of the local oscillator 914 is set to a value that is little deviated from the frequency of the received signals so that the image signals can be eliminated completely by the first bandpass filter 911.

In a case where there is a large-power adjacent channel signal in the vicinity of the frequency of the received signals and such adjacent channel signal cannot be eliminated by the first bandpass filter 911, the energy of the adjacent channel signal is also mixing-processed by the mixer circuit 913 simultaneously.

The signals converted into the intermediate frequency signals by the mixing processing go through the A/D converter 916, the quadrature demodulation circuit 916, and the low-pass filter 917 where the adjacent channel signals are eliminated therefrom at last, and are sent to the demodulation circuit 920. That is, when the adjacent channel signals are not eliminated completely by the first bandpass filter 911, the adjacent channel signals are processed along with the received signals, thereby causing deterioration in the S/N ratio.

FIG. 13 is an explanatory chart showing the flow of signal conversion done by the direct conversion type reception circuit 930 or 940 shown in FIG. 10 to FIG. 11. FIG. 13A shows the frequency characteristic of the output signal at a stage of output from the first bandpass filter 931, FIG. 13B shows that of a stage of output from the quadrature demodulation circuit 933, and FIG. 13C shows that of a stage of output from the first low-pass filter 935, respectively.

With this type, the received signal is directly quadrature-demodulated by the quadrature demodulation circuit 933, and converted to a baseband signal having the center of the received signal frequency band as a direct current (DC). In this case, as in the case of the super heterodyne type receiver, the passband of the first bandpass filter 931 is set to be wider than the bandwidth of the actual receiving signal so as to be able to deal with a plurality of radio channels.

Therefore, as in the case of the super heterodyne type, the adjacent channel signals are processed along with the received signals and the S/N ratio is deteriorated also in the direct conversion type when there is a large-power adjacent channel signal in the vicinity of the received signals and the adjacent channel signal is not eliminated completely by the first bandpass filter 931.

As the technical documents related thereto, there are each of following documents. Depicted in Patent Document 1 is a technique which makes it possible to use a plurality of kinds of radio communication services by converting receiving signals to be of an intermediate frequency. Depicted in Patent Document 2 is a reception circuit which controls the band blocking filter characteristics for decreasing the influence of the interference waves for the receiving signals. Depicted in Patent Document 3 is a technique which eliminates a direct current offset by a quadrature demodulator.

Depicted in Patent Document 4 is a reception circuit which uses signals of a plurality of reception bands. Depicted in Patent Document 5 is a reception circuit which recognizes a data transfer rate, and selects the circuit constant accordingly. Depicted in Patent Document 6 is a reception circuit which controls the frequency band and the amplification rate according to the quality of receiving signals.

Depicted in Patent Document 7 is a technique which controls inserted signals of a mixer circuit for eliminating unnecessary image signals. Depicted in Patent Document 8 is a technique which controls detection signals in an FM receiver according to presence of adjacent interference signals.

Patent Document 1: Japanese Patent No. 4456635 (Japanese Patent Application Publication 2008-511260)
Patent Document 2: Japanese Unexamined Patent Publication 2011-193079
Patent Document 3: Japanese Unexamined Patent Publication 2008-079242
Patent Document 4: Japanese Unexamined Patent Publication 2006-319537
Patent Document 5: Japanese Unexamined Patent Publication 2006-262088
Patent Document 6: Japanese Unexamined Patent Publication 2006-109207
Patent Document 7: U.S. Pat. No. 7,272,374
Patent Document 8: U.S. Pat. No. 4,907,293 (Japanese Utility Model Publication Hei 02-032248)

As described in the section of the Related Art, there is such an issue with the cases of any of the reception circuits 910, 930, and 940 of the super heterodyne type and the direct conversion type shown in FIGS. 9 to 11 that the S/N ratio is decreased relatively due to the signal component (spurious) and the reception sensitivity becomes deteriorated in a case where there are strong signals in the vicinity of the target frequency and such signals cannot be eliminated by the bandpass filter 911 or 931 in the previous stage.

In order to prevent such issue, it is necessary to eliminate the adjacent channel signals as much as possible by the bandpass filter 911 or 931 in the previous stage of the reception circuit. That is, the bandpass filter 911 or 931 is required to achieve as high performance as possible.

However, such high-performance bandpass filter normally has a fixed passband, and it is high in price and mounting area thereof is large. In recent digital communication in particular, it is required to be able to deal with a great number of frequency bands (channels) and to be of small in size, low in price, and low in consumption. Therefore, it is not practical to decrease the influence of the adjacent channels by simply using the "high-performance bandpass filter".

Note here that it is also considered to overcome the above issues through using a variable bandpass filter that can change the passband according to the frequency of the receiving signal as the target. However, the "large-power signals of the adjacent channels" are not necessarily limited to exist with a same frequency at all times. When such signals are generated due to illegal radio or the like, the signals may or may not exist depending on the time zone and the frequency thereof may shift to another frequency.

A case where the frequency of the adjacent channel is changed after setting the variable bandpass filter to a certain passband and a case where the large-power signal of the adjacent channel disappears cannot be dealt with the existing techniques.

Further, to narrow the passband of the variable bandpass filter means to decrease the necessary signal components, so that it is unavoidable to sacrifice the S/N ratio of the target receiving signals to some extent or more. In a case where the large-power signal of the adjacent channel disappears in particular, it is desirable to improve the S/N ratio of the receiving signals by expanding the passband of the variable bandpass filter. However, it is not possible to deal with such case with the existing techniques.

Techniques capable of overcoming the above issues are not depicted in any of Patent Documents 1 to 8. Patent Document 1 discloses a technique which switches the sampling frequency and the like according to the types of the services. Further, Patent Document 5 discloses a technique which switches the circuit constant according to the data transfer rate. However, neither of those techniques is related to the passband of the bandpass filter of the previous stage of the reception circuit.

It is therefore the object of the present invention to provide a radio reception circuit, a radio reception method, and a radio reception program capable of preventing deterioration in the S/N ratio caused by spurious of the high-output adjacent channel signals.

DISCLOSURE OF THE INVENTION

In order to achieve the foregoing object, the radio reception circuit according to the present invention is a radio reception circuit which demodulates and outputs a received signal received by an antenna, which includes: a variable bandpass filter for passing a particular frequency and a particular bandwidth from the received signal and a demodulation circuit for demodulating the received signal passed through the variable bandpass filter and outputting as an ultimate output signal; a frequency characteristic table which stores in advance a plurality of kinds of parameters regarding the frequency and the bandwidth for passing through the variable bandpass filter; an S/N ratio measurement circuit which calculates an S/N ratio of the output signal in a case where one of the plurality of kinds of parameters is applied to the variable bandpass filter; and a control unit which controls the S/N ratio measurement circuit to calculate the S/N ratio for all of the plurality of kinds of parameters and sets, to the variable bandpass filter, the parameter with which a best S/N ratio among those can be acquired.

In order to achieve the foregoing object, the radio reception method according to the present invention is a radio reception method used with a radio reception circuit which includes a variable bandpass filter for passing a particular frequency and a particular bandwidth from a received signal received by an antenna and a demodulation circuit for demodulating the received signal passed through the variable bandpass filter and outputting as an ultimate output signal, wherein: an S/N ratio measurement circuit calculates an S/N ratio of the output signal in a case where one of a plurality of kinds of parameters stored in advance in a frequency characteristic table regarding the frequency and the bandwidth passing through the variable bandpass filter is applied to the variable bandpass filter; a control unit controls the S/N ratio measurement circuit to calculate the S/N ratios for all of the plurality of kinds of parameters; and the control unit sets, to the variable bandpass filter, the parameter with which a best S/N ratio among those can be acquired.

In order to achieve the foregoing object, the radio reception program according to the present invention is a radio reception program used in a radio reception circuit which includes a variable bandpass filter for passing a particular frequency and a particular bandwidth from a received signal received by an antenna and a demodulation circuit for demodulating the received signal passed through the variable bandpass filter and outputting as an ultimate output signal, the program causing a processor provided to the radio reception circuit to execute: a procedure for calculating an S/N ratio of the output signal in a case where one of a plurality of kinds of parameters stored in advance in a frequency characteristic table regarding the frequency and the bandwidth passing through the variable bandpass filter is applied to the variable bandpass filter; a procedure for repeating calculation of the S/N ratio for all of the plurality of kinds of parameters; and a procedure for setting, to the variable bandpass filter, the parameter with which a best S/N ratio among those can be acquired.

The present invention is designed to calculate the S/N ratios for all of the plurality of parameters as described above and to set the parameter capable of acquiring the best S/N ratio among those. Thus, regardless of the presence of the large-power signals of the adjacent channels and even when the frequency thereof changes, it is possible to perform communication with the best S/N ratio by corresponding to each occasion. This makes it possible to provide a radio reception circuit, a radio reception method, and a radio reception program exhibiting an excellent feature of being able to prevent deterioration in the S/N ratio caused by spurious of the high-output adjacent channel signals.

BRIEF DESCRIPTION OF THE DRAWINGS

FIGS. 4A-4C are explanatory charts showing virtual power spectrum acquired by multiplying the frequency characteristic to normalized power spectrum by the S/N ratio measurement circuit shown in FIG. 2, in which FIG. 4A shows the normalized power spectrum, FIG. 4B shows the frequency characteristic in a narrow band mode, and FIG. 4C shows the virtual power spectrum acquired by multiplying those;

FIGS. 5A-5C are explanatory charts showing a flow of signal conversion in a wide band mode of the radio reception circuit shown in FIG. 2, in which FIG. 5A shows the frequency characteristic of an output signal at a stage of output from a bandpass filter, FIG. 5B shows that of a stage of output from a quadrature demodulation circuit, and FIG. 5C shows that of a stage of output from a low-pass filter, respectively;

FIGS. 6A-6C are explanatory charts showing a flow of signal conversion in a narrow band mode of the radio reception circuit shown in FIG. 2, in which FIG. 6A shows the frequency characteristic of an output signal at a stage of output from the bandpass filter, FIG. 6B shows that of a stage of output from the quadrature demodulation circuit, and FIG. 6C shows that of a stage of output from the low-pass filter, respectively;

FIGS. 12A-12C are explanatory charts showing a flow of signal conversion in the super heterodyne type reception circuit shown in FIG. 9, in which FIG. 12A shows the frequency characteristic of an output signal at a stage of output from a first bandpass filter, FIG. 12B shows that of a stage of output from a mixer circuit, and FIG. 12C shows that of a stage of output from a low-pass filter, respectively; and FIGS. 13A-13C are explanatory charts showing a flow of signal conversion in the direct conversion type reception circuit shown in FIGS. 10 to 11, in which FIG. 13A shows the frequency characteristic of an output signal at a stage of output from a first bandpass filter, FIG. 12B shows that of a stage of output from a quadrature demodulation circuit, and FIG. 13C shows that of a stage of output from a first low-pass filter, respectively.

BEST MODES FOR CARRYING OUT THE INVENTION

Basic Embodiment

Figure 1:
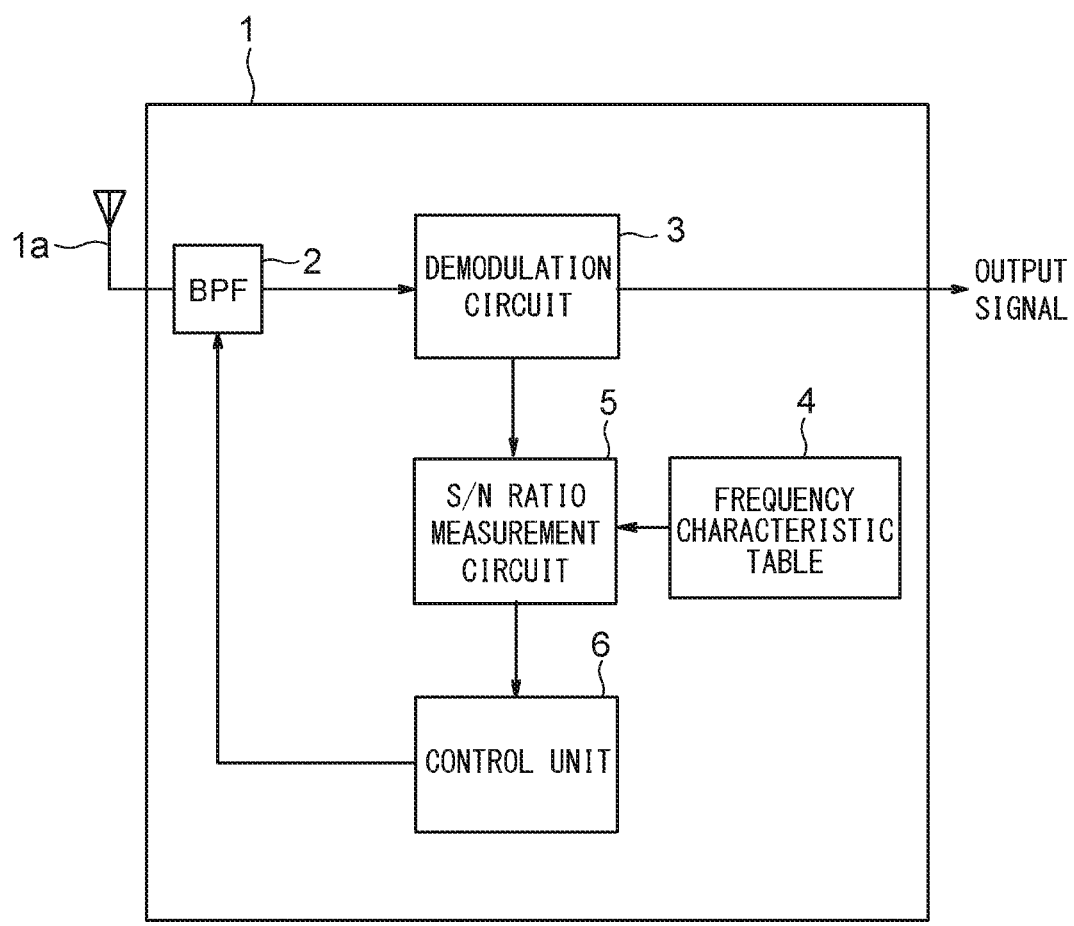
FIG. 1 is an explanatory chart showing structures of a radio reception circuit according to a basic embodiment of the present invention.

Hereinafter, structures of a basic embodiment of the present invention will be described by referring to the accompanying drawing FIG. 1.

A radio reception circuit 1 according to the basic embodiment is a radio reception circuit which demodulates and outputs received signals received by an antenna 1a, which includes: a variable bandpass filter 2 which passes a particular frequency and a particular bandwidth from the received signal; a demodulation circuit 3 which demodulates the received signal passed through the variable bandpass filter and outputs it as an ultimate output signal; a frequency characteristic table 4 which stores in advance a plurality of kinds of parameters regarding the frequencies and the bandwidths that pass through the variable bandpass filter; an S/N ratio measurement circuit 5 which calculates an S/N ratio of an output signal when one of the plurality of parameters is applied to the variable bandpass filter; and a control unit 6 which controls the S/N ratio measurement circuit to calculate the S/N ratios for all of the plurality of kinds of parameters and sets, to the variable bandpass filter, the parameter with which the best S/N ratio among those can be acquired.

More detailed structures of each of those modules will be described as a next embodiment.

Embodiment

Subsequently, structures of an embodiment of the present invention will be described by referring to the accompanying drawing FIG. 2.

A radio reception circuit 10 according to the embodiment of the present invention is a radio reception circuit which demodulates and outputs received signals received by an antenna, which includes: a variable bandpass filter 101 which passes a particular frequency and a particular bandwidth from the received signal; a demodulation circuit 110 which demodulates the received signal passed through the variable bandpass filter and outputs it as an ultimate output signal; a frequency characteristic table 114 which stores in advance a plurality of kinds of parameters regarding the frequencies and the bandwidths passing through the variable bandpass filter; an S/N ratio measurement circuit 112 which calculates an S/N ratio of an output signal when one of the plurality of parameters is applied to the variable bandpass filter; and a control unit 113 which makes the S/N ratio measurement circuit calculate the S/N ratios for all of the plurality of kinds of parameters and sets, to the variable bandpass filter, the parameter with which the best S/N ratio among those can be acquired.

Further, the control unit 113 includes a plurality of operation modes with different bandwidths and a function which controls the S/N ratio measurement circuit to calculate the S/N ratios after setting a first operation mode with a wider bandwidth to the variable bandpass filter and sets a second operation mode with a narrower bandwidth to the variable bandpass filter to operate with the parameter with which the best S/N ratio can be acquired. Further, a power spectrum measurement circuit 111 which normalizes the frequency band of the output signal in the first operation mode and outputs the signal to the S/N ratio measurement circuit is provided in a previous stage of the S/N ratio measurement circuit 112.

Further, the radio reception circuit 10 includes: a quadrature demodulation circuit 103 which performs quadrature demodulation on the received signals passed through the variable bandpass filter; a low-pass filter 105 which passes a low frequency side of the quadrature-demodulated signals; an A/D converter 106 which performs A/D conversion on the output from the low-pass filter; and a frequency conversion circuit 107 which converts the A/D-converted signals to intermediate frequency signals and output those to the demodulation circuit. Further, the control unit 113 sets, to the variable bandpass filter and the low-pass filter, the parameter with which the best S/N ratio can be acquired.

By providing the structures described above, the radio reception circuit 10 becomes capable of preventing deterioration in the S/N ratio caused by spurious of the high-output adjacent channel signals.

Hereinafter, this will be described in more details.

Figure 2:
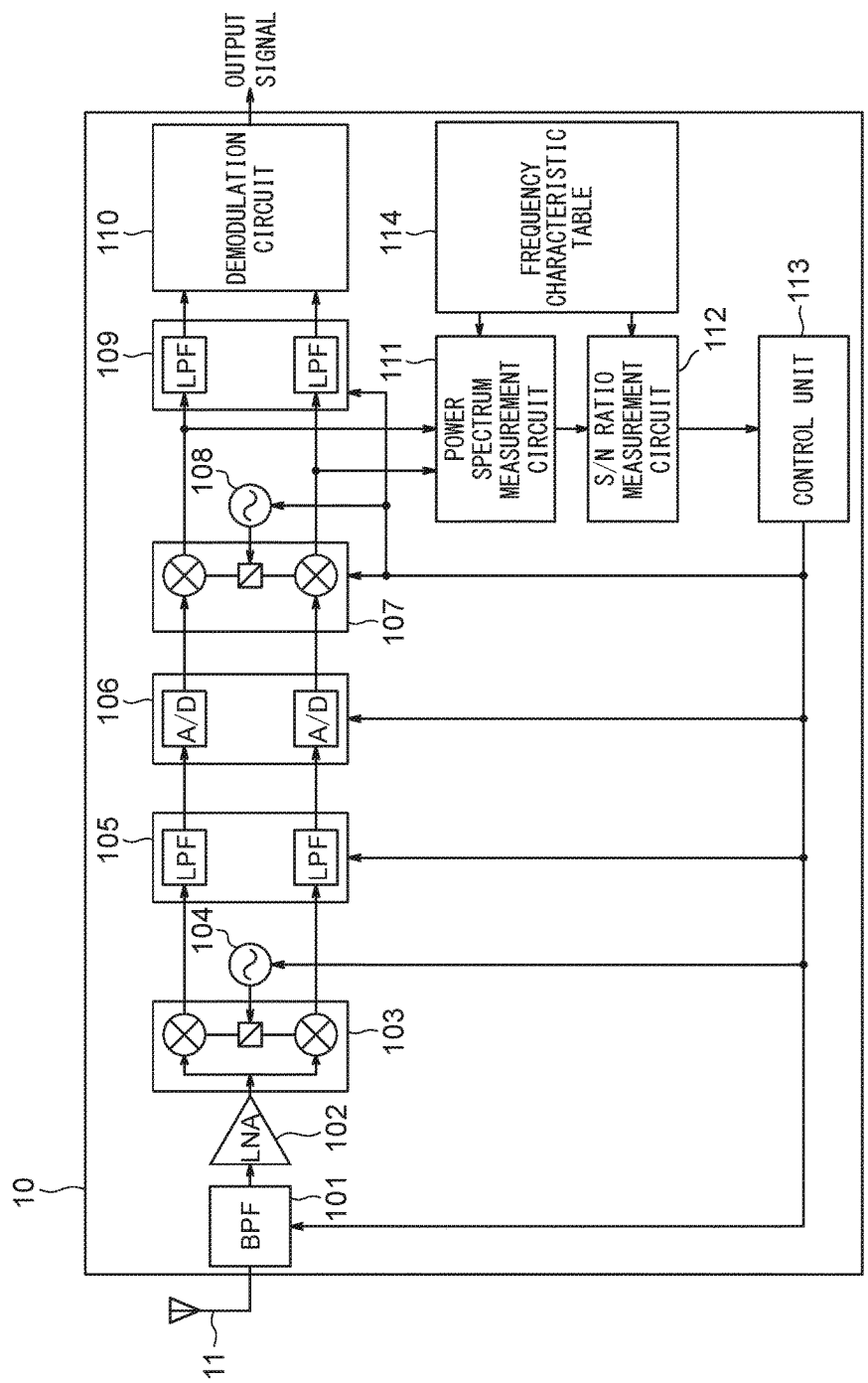
FIG. 2 is an explanatory chart showing structures of a radio reception circuit according to an embodiment of the present invention.

FIG. 2 is an explanatory chart showing the structures of the radio reception circuit 10 according to the embodiment of the present invention. The radio reception circuit 10 includes: the variable bandpass filter 101 (BPF) which passes a particular frequency and a particular bandwidth from RF signals inputted from an antenna 11; a low-noise amplifier 102 which amplifies output signals from the variable bandpass filter 101; the quadrature demodulation circuit 103 which performs quadrature demodulation on the amplified output signals; and a local oscillator 104 which supplies local oscillation signals to the quadrature demodulation circuit 103.

The pass frequency and passband width of the variable bandpass filter 101 as well as the oscillation frequency of the local oscillator 104 can be changed by control signals to be described later.

The radio reception circuit 10 further includes: an intermediate frequency low-pass filter 105 (LPF) which passes a low frequency side of the output from the quadrature demodulation circuit 103; the A/D converter 106 which performs A/D conversion on the output signals from the intermediate frequency low-pass filter 105; the frequency conversion circuit 107 which converts the A/D converted signals to the intermediate frequency signals; and a numerical value control oscillator 108 which supplies operation frequency signal to the frequency conversion circuit 107.

The passband width of the intermediate frequency low-pass filter 105, the sampling frequency of the A/D converter 106 and the frequency conversion circuit 107, and the oscillation frequency of the numerical value control oscillator 108 can be changed by control signals to one described later.

Further, the radio reception circuit 10 includes: a baseband frequency digital low-pass filter 109 (LPF) which passes a low frequency side of the output from the frequency conversion circuit 107; and the demodulation circuit 110 which demodulates the output signal from the baseband frequency digital low-pass filter 109 to have an ultimate output signal. The input sampling frequency of the baseband frequency digital low-pass filter 109 can be changed by the control signals to be described later.

In addition to those, the radio reception circuit 10 includes: the frequency characteristic table 114 which stores in advance a plurality of kinds of frequency characteristic parameters between the variable bandpass filter 101 (BP) and the intermediate frequency low-pass filter 105 (LPF); the power spectrum measurement circuit 111 which acquires a normalization value of the power spectrum from the output signals of the frequency conversion circuit 107; the S/N ratio measurement circuit 112 which acquires a signal power component and a noise component from the output signal of the power spectrum measurement circuit 111; and the control unit 113 which controls each unit by outputting control signals based on the acquired signal power component and the noise component.

(Actions in Wide Band Mode)

The radio reception circuit 10 described above has two operation modes such as a "wide band mode" and a "narrow band mode", and operates by switching those operation modes. First, the actions in the wide band mode will be described.

In the wide band mode, the bandpass filter 101 is set not to pass the wide frequency bands which include the entire peripheral frequency bands including the adjacent channels. The received signal passed through the bandpass filter 101 is amplified by the low-noise amplifier 102 and quadrature demodulation processing is performed thereon by the quadrature demodulation circuit 103. The frequency of the local oscillator 104 which oscillates the local oscillation signal used for the quadrature demodulation processing is set by the low-pass filter 105 as the frequency that can pass the entire peripheral frequency bands.

The high-range frequency of the received signal on which the quadrature demodulation is performed is cut at the low-pass filter 105. The low-pass filter 105 is also set to pass the wide bandwidths so that the entire peripheral frequency bands can pass therethrough.

The received signal passed through the low-pass filter 105 is converted to a digital signal by the A/D converter 106. Also, the sampling frequency of the A/D converter 106 is so set that the entire peripheral frequency bands can be reproduced.

The frequency of the received signal in a digital signal form converted by the A/D converter 106 is converted to be a baseband signal in the frequency conversion circuit 107. The frequency conversion circuit 107 and the numerical value control oscillator 108 are set to correspond to the sampling frequency of the A/D converter 106, and also set so that the center of the frequency of the target received signal becomes a direct current (DC).

The baseband signal outputted from the frequency conversion circuit 107 has the adjacent channel component eliminated by going through the low-pass filter 109 and the demodulation circuit 110, and only the target received signal is extracted. At the same time, the baseband signal outputted from the frequency conversion circuit 107 is outputted also to the power spectrum measurement circuit 111.

Figure 3:
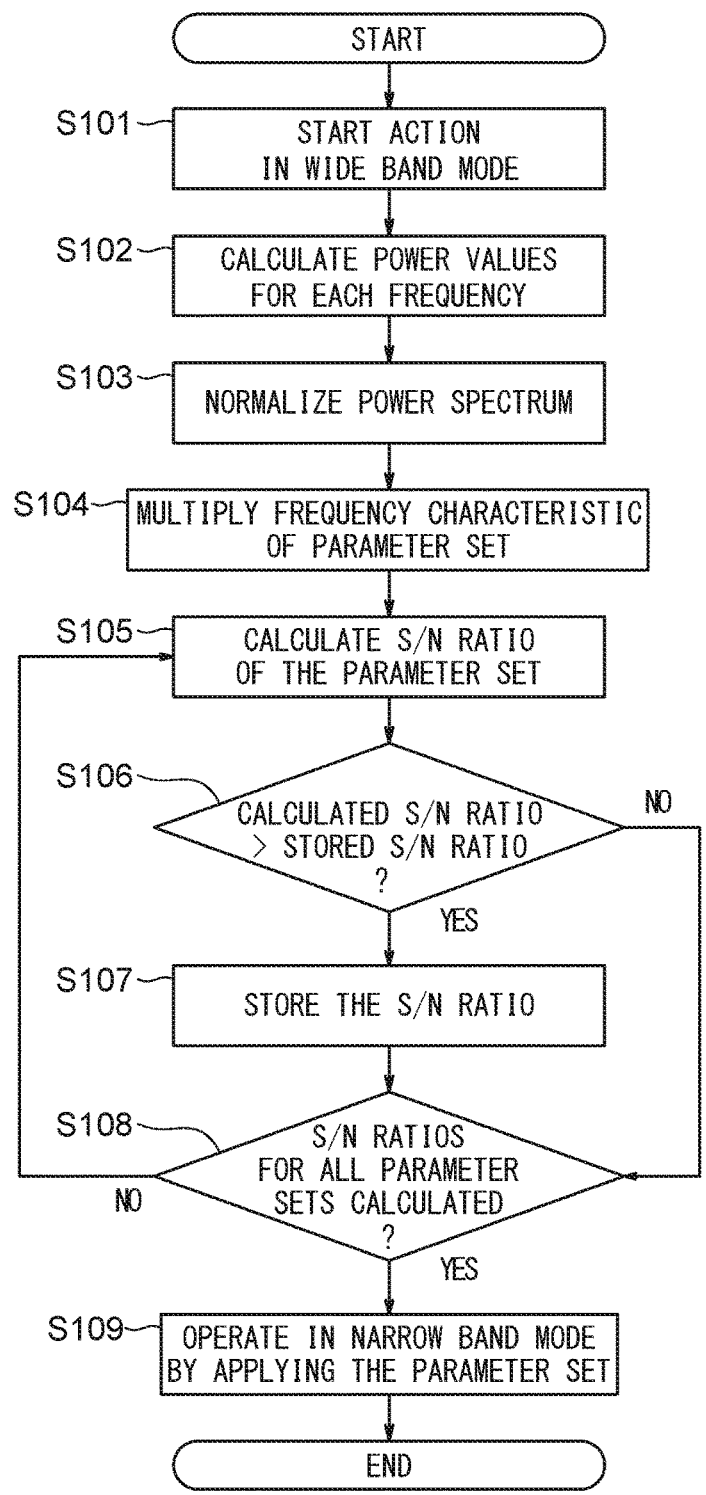
FIG. 3 is a flowchart showing actions of a power spectrum measurement circuit, an S/N ratio measurement circuit, and a control unit shown in FIG. 2.

FIG. 3 is a flowchart showing actions of the power spectrum measurement circuit 111, the S/N ratio measurement circuit 112, and the control unit 113 shown in FIG. 2.

The power spectrum measurement circuit 111 started the operation in the wide band mode (step S101) acquires the reception power for each frequency within the band by an algorithm such as Fourier transform or the like (step S102), and acquires normalized spectrum with respect to the baseband signal outputted from the frequency conversion circuit 107 by multiplying the pass characteristic values of the bandpass filter 101 and the low-pass filter 105 under the wide band mode stored in the frequency characteristic table 114 thereto (step S103).

To the normalized power spectrum, the S/N ratio measurement circuit 112 multiplies the frequency characteristic for a combination of the individual parameters such as the passband of the bandpass filter 101, the frequency of the local oscillator 104, the passband of the low-pass filter 105, and the like (referred to as a parameter set) (step S104) to acquire the current power spectrum virtually in a case where the parameter set is used, and acquires the SN ratio from the signal power and the noise power of such case (step S105).

FIGS. 4A to 4C are explanatory charts showing the virtual power spectrum acquired by the S/N ratio measurement circuit 112 shown in FIG. 2 through multiplying the frequency characteristic to the normalized power spectrum. FIG. 4A shows the normalized power spectrum, FIG. 4B shows the frequency characteristic in the narrow band mode, and FIG. 4C shows the virtual power spectrum acquired by multiplying those, respectively.

The S/N ratio measurement circuit 112 acquired the signal power by integrating the power values of the frequencies in the bandwidth corresponding to the target received signals from the virtual power spectrum shown in FIG. 4C, and acquires the noise power by integrating the power values of the other frequencies. The ratio thereof is the S/N ratio.

The control unit 113 controls the S/N ratio measurement circuit 112 to calculate the S/N ratios for a plurality of parameter sets, and acquires the parameter set with which the S/N ratio becomes the largest (steps S106 to 108). Further, the parameter set with which the S/N ratio becomes the largest is set to the bandpass filter 101, the local oscillator 104, and the low-pass filter 105.

At the same time, the control unit 113 decreases the sampling frequency of the A/D converter 106 as the reception band becomes narrower, decreases the conversion speed of the frequency conversion circuit 107 to correspond to the sampling frequency, adjusts the numerical value control oscillator 108 so that the center frequency of the received signal after the quadrature demodulation becomes direct current, and decreases the input frequency of the low-pass filter 109 further according to the decrease in the sampling frequency to switch the actions of the radio reception circuit 10 to the narrow band mode (step S109).

(Actions of Narrow Band Mode)

The control unit 113 performs the setting described above to switch the actions of the radio reception circuit 10 to the narrow band mode. That is, the narrow band mode is the actions executed with the parameter set with which the S/N ratio acquired in the wide band mode becomes the highest.

In the narrow band mode, the received signals first pass through the RF signal bandpass filter 101 where the signal of the unnecessary band is eliminated. The received signal passed through the bandpass filter 101 is amplified by the low-noise amplifier 102, and quadrature demodulation processing is performed thereon by the quadrature demodulation circuit 103.

The high-range frequency of the received signal on which the quadrature demodulation processing is performed is cut in the low-pass filter 105. In the narrow band mode, the low-pass filter 105 is set to have the narrow bandwidth with which only the target receiving signals can pass through as much as possible.

The received signal passed through the low-pass filter 105 is converted into a digital signal by the A/D converter 106, and further the frequency thereof is converted by the frequency conversion circuit 107 to be a baseband signal. The received signal with the frequency converted to the vicinity of the direct current by the frequency conversion circuit 107 has the adjacent channel component eliminated by the low-pass filter 109 and the demodulation circuit 110, and only the target received signal is extracted. In the narrow band mode, processing by the power spectrum measurement circuit 111, the S/N ratio measurement circuit 112, and the control unit 113 is not performed.

Figure 5A:
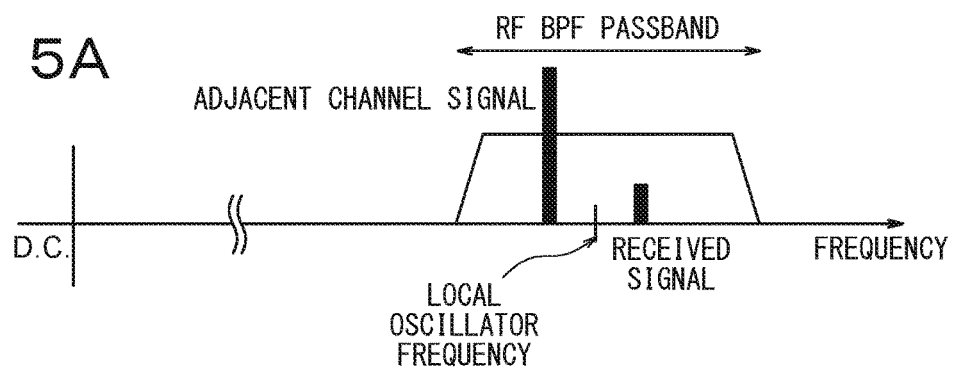
Figure 5B:
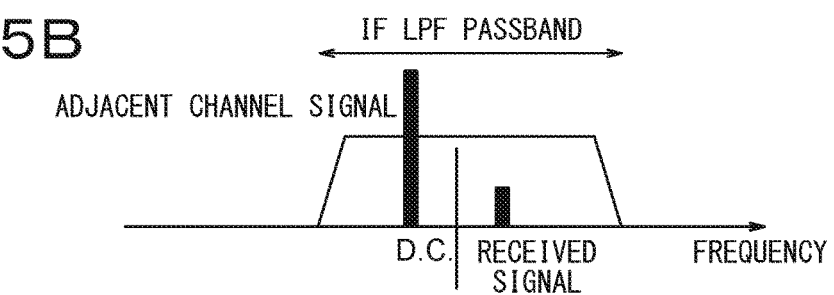
Figure 5C:
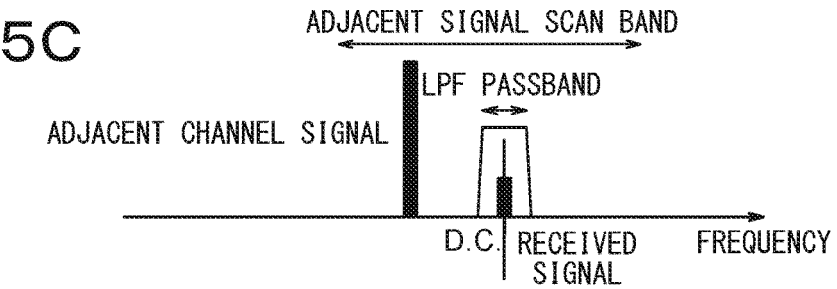

FIGS. 5A to 5C are explanatory charts showing a flow of signal conversion in the wide band mode of the radio reception circuit 10 shown in FIG. 2. FIG. 5A shows the frequency characteristic of an output signal at a stage of output from the bandpass filter 101, FIG. 5B shows that of a stage of output from the quadrature demodulation circuit 103, and FIG. 5C shows that of a stage of output from the low-pass filter 105, respectively.

As shown in FIGS. 5A to 5C, in the wide band mode, the reception processing is performed with a wide band including the large-power signals of the adjacent channels. Thus, it is likely to receive the influence of the large-power signals. However, the control unit 113 searches "the parameter set with which the S/N ratio becomes the highest" under such state, and switches the actions of the radio reception circuit 10 to the narrow band mode using the parameter set.

Figure 6A:
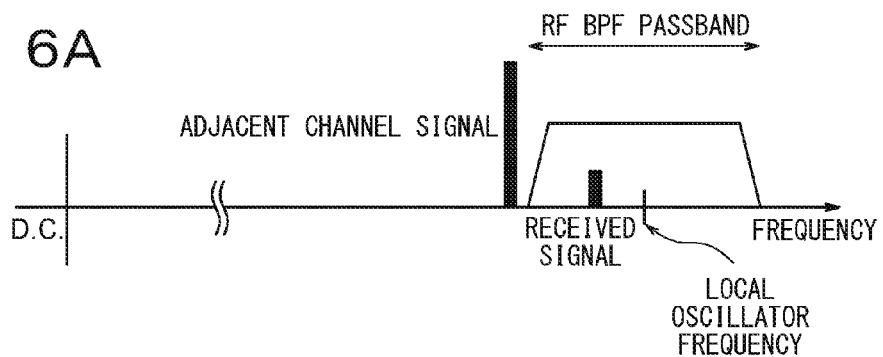
Figure 6B:
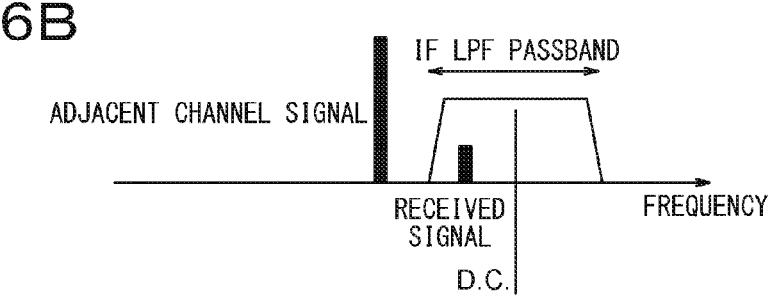
Figure 6C:
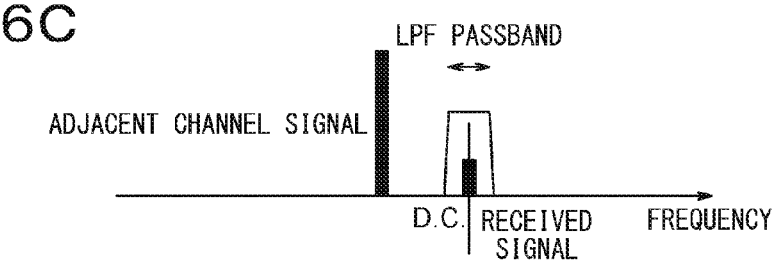

FIGS. 6A to 6C are explanatory charts showing a flow of signal conversion in the narrow band mode of the radio reception circuit 10 shown in FIG. 2. Each of FIGS. 6A to 6C corresponds to FIGS. 5A to 5C, respectively. As shown in FIGS. 6A to 6C, in the narrow band mode, the large-power signals of the adjacent channels are already eliminated by the bandpass filter 101. Thus, the deterioration in the S/N ratio caused by the influence of the large-power signals can be suppressed.

Figure 7:
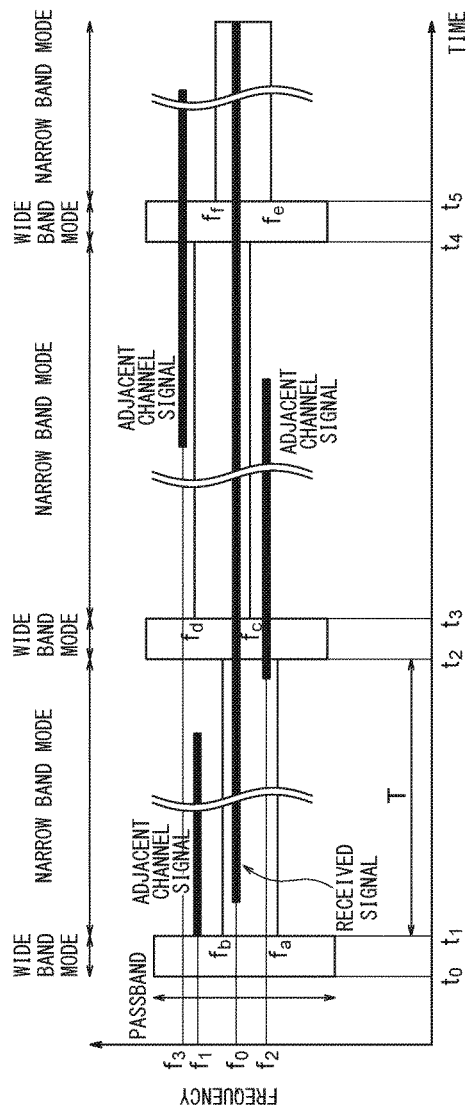
FIG. 7 is an explanatory chart showing switching of the actions in the narrow band mode and the wide band mode in the radio reception circuit shown in FIG. 2.

FIG. 7 is an explanatory chart showing switching of actions of the radio reception circuit 10 shown in FIG. 2 in the narrow band mode and the wide band mode. The radio wave state received by the radio reception circuit 10 changes dynamically. For example, there may be a case where the large-power signals of the adjacent channels disappear or there may be a case where the frequency thereof is shifted to another frequency.

In the case shown in FIG. 7, the radio reception circuit 10 turns to the wide band mode at time t0. There is an adjacent channel signal at the frequency f1 that is adjacent to the original received signal frequency f0, so that it is shifted to the narrow band mode with a frequency range of fa to fb to avoid the frequency f1 at time t1. Then, the action is shifted to the wide band mode again at time t2 (=t1+T) where a preset period T has passed from the time t1. This time, there is an adjacent channel signal at a frequency f2 that is different from the frequency f1, so that the action is shifted to the narrow band mode with a frequency range of fc to fd to avoid the frequency f2 at time t3. Thereinafter, the actions continue in the same manner.

As described, the radio reception circuit 10 switches the actions periodically from the narrow band mode to the wide band mode, executes the processing by the power spectrum measurement circuit 111, the S/N ratio measurement circuit 112, and the control unit 113 again, and shifts the actions to the narrow band mode. Alternatively, the actions may be shifted to the narrow band mode in a case where deterioration in the S/N ratio caused by the influence of the large-power signal is detected by an external measuring module, or, in a case where there is an action command input from a user. The actions in the wide band mode can be done in a very short time with respect to the entire action time, so that the influence imposed upon the reception performance is small considering the entire action time.

When there is no large-power signal of the adjacent channel, shift to the narrow band mode itself is not necessary or the passband of the bandpass filter 101 can be set wide to some extent even when the mode is shifted. Normally, the necessary signal component becomes deteriorated as well when the passband of the bandpass filter 101 is narrowed, which deteriorates the S/N ratio. However, it does not happen with the embodiment. Deterioration in the S/N ratio can be suppressed even when there is no large-power signal of the adjacent channel.

(More Specific Structures)

Figure 8:
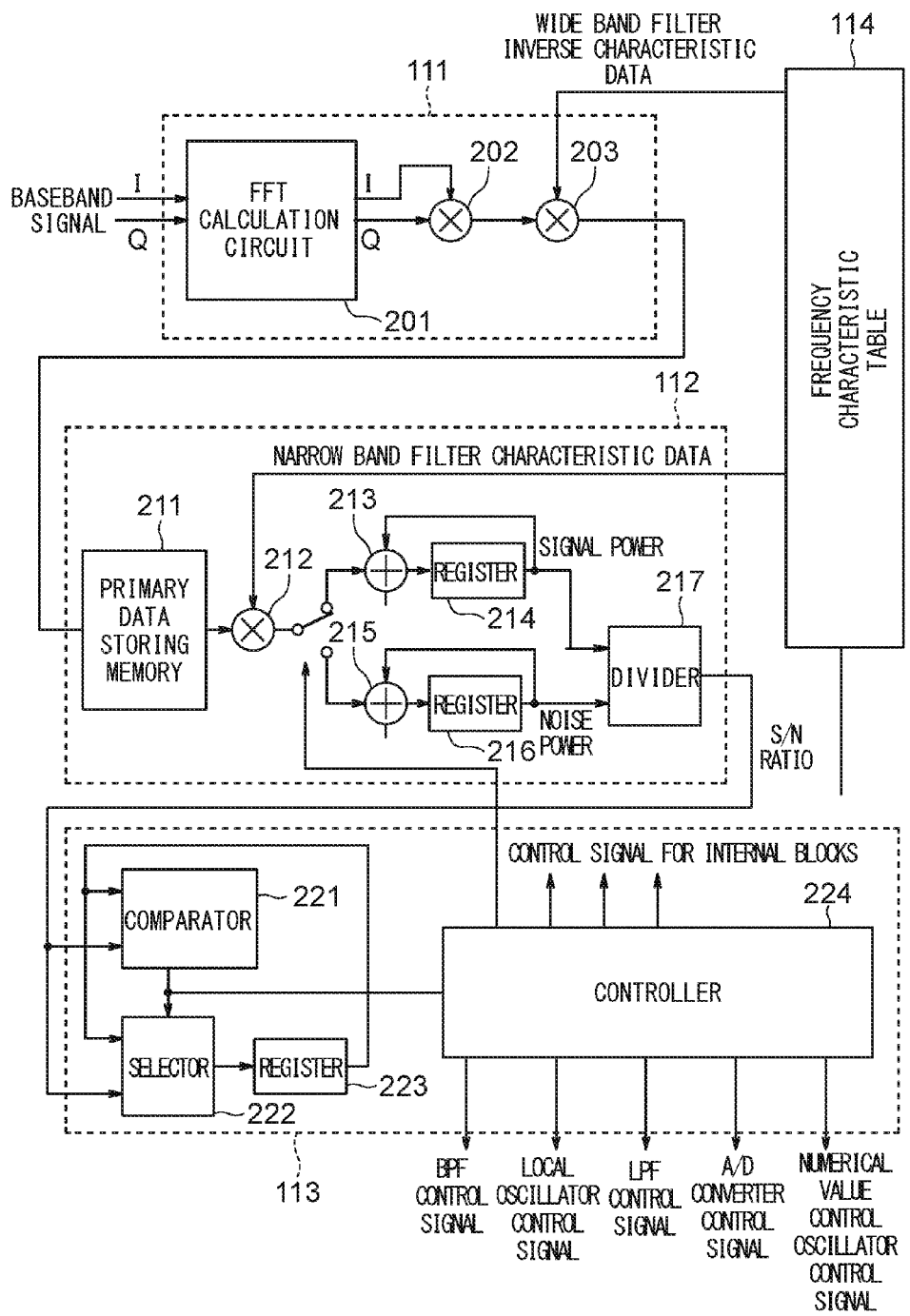
FIG. 8 is an explanatory chart showing more specific structures of the power spectrum measurement circuit, S/N ratio measurement circuit, and the control unit shown in FIG. 2.
Figure 9:
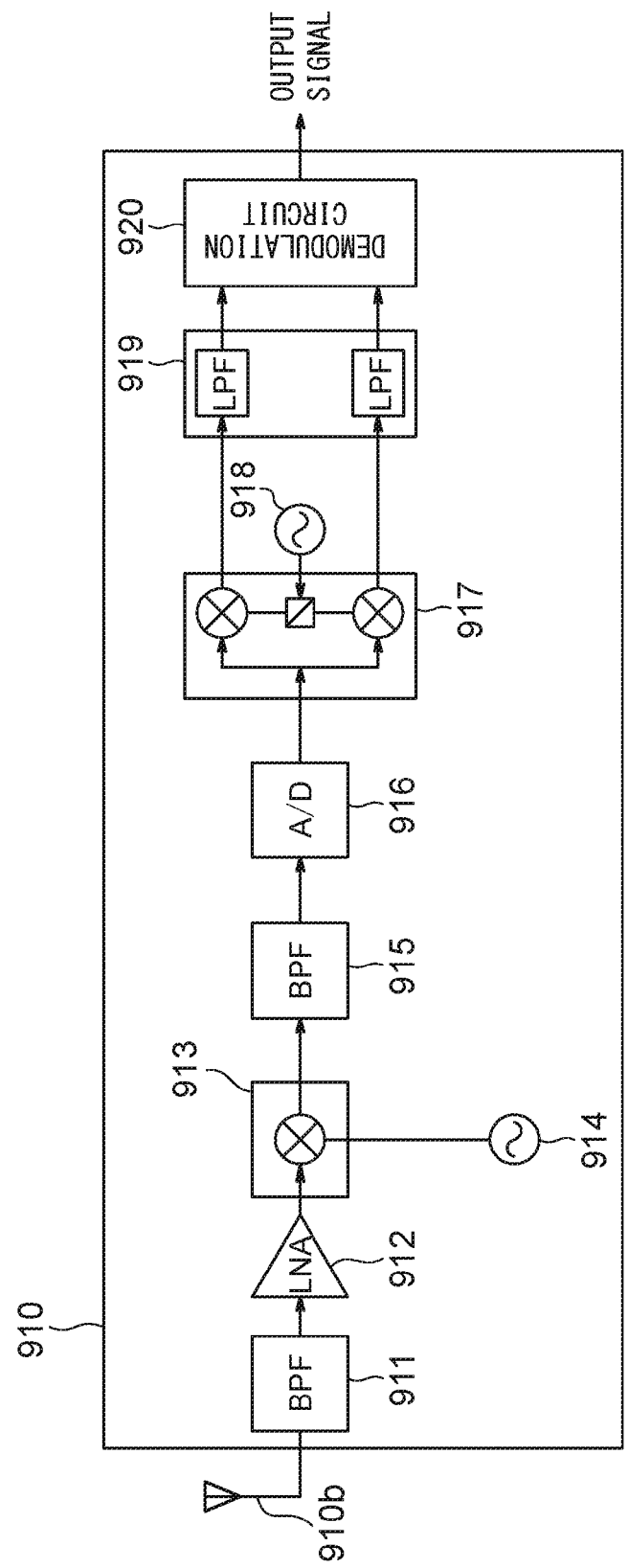
FIG. 9 is an explanatory chart showing structures of a super heterodyne type reception circuit used in an existing radio receiver.
Figure 10:
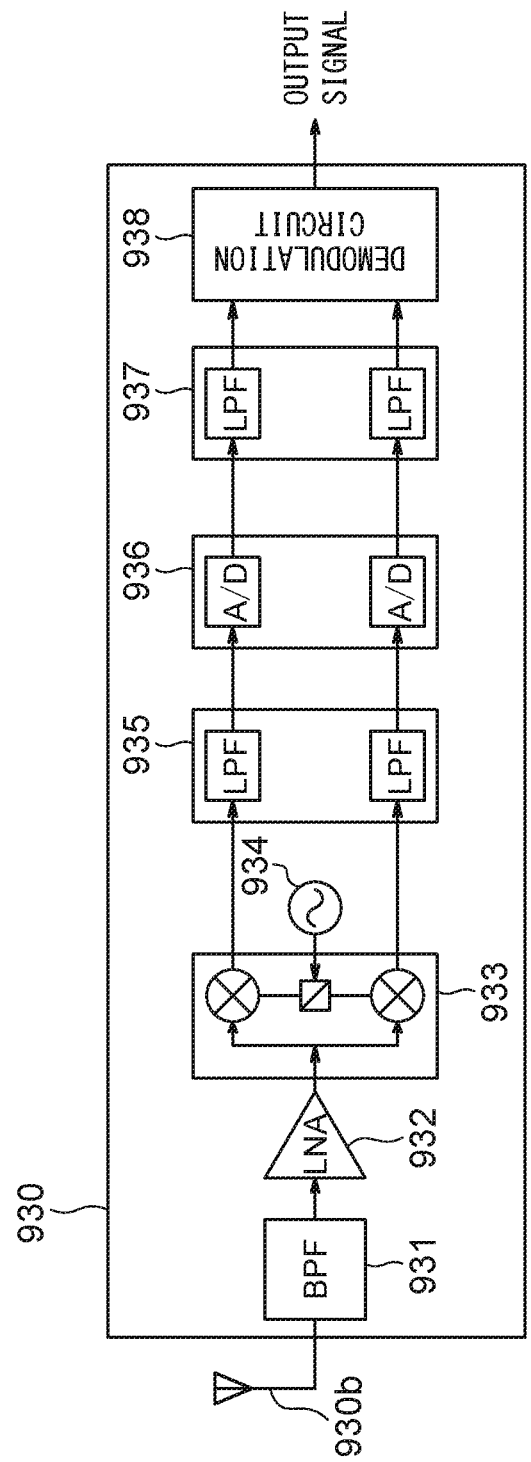
FIG. 10 is an explanatory chart showing structures of a direct conversion type reception circuit used in an existing radio receiver.

FIG. 8 is an explanatory chart showing more detailed structures of the power spectrum measurement circuit 111, the S/N ratio measurement circuit 112, and the control unit 113 shown in FIG. 2.

The power spectrum measurement circuit 111 includes: an FFT calculation circuit 201 which integrates the baseband signals passed through the frequency conversion circuit 107 to convert to frequency components; a power calculation circuit 202 which integrates I component and Q component of each of the frequency components converted by the FFT calculation circuit 201; and a normalization circuit 203 which acquires normalized frequency spectrum by multiplying the power values of the integrated components of each of the frequencies to the wide band filter inverse characteristic data stored in the frequency characteristic table 114.

The S/N ratio measurement circuit 112 includes: a primary data storing memory 211 which temporarily stores the normalized frequency spectrum outputted from the power spectrum measurement circuit 111; and a multiplier 212 which acquires a virtual frequency spectrum by multiplying a certain narrow band filter characteristic data stored in the frequency characteristic table 114 to the frequency spectrum.

Further, the S/N ratio measurement circuit 112 integrates the data within the frequency band to be the target of the virtual frequency spectrum by an adder 213, stores it to a register 214, and takes it as a signal power value. Similarly, the data within other frequency bands are integrated by an adder 215, stored to a register 216, and taken as a noise power value. A divider 217 divides the signal power value by the noise power value to acquire the S/N ratio in the narrow band filter characteristic, and it is outputted to the control unit 113.

The control unit 113 includes: a controller 224 which controls each of the actions described above and sequentially calculates the S/N ratios in the narrow band filter characteristics for each of a plurality of narrow band filter characteristics stored in the frequency characteristic table 114; a comparator 221 which compares the value of the S/N ratio outputted from the divider 217 with the value of the S/N ratio one before; a selector 222 which outputs the larger value out of the compared S/N ratios; and a register 223 which saves the output value from the selector 222. That is, through repeating this processing for all of the plurality of narrow band filter characteristics, the narrow band filter characteristic with which the S/N ratio becomes the maximum can be acquired.

Further, the controller 224 outputs control signals for each element of the radio reception circuit 10 by corresponding to the desired narrow band filter characteristic to set the parameters with which the S/N ratio becomes the maximum to the bandpass filter 101, the local oscillator 104, the low-pass filter 105, and the like.

Overall Actions and Effects of Embodiment

Next, the overall actions of the above embodiment will be described.

A radio reception method according to the embodiment is used with the radio reception circuit 10 which includes: the variable bandpass filter 101 which passes a particular frequency and a particular bandwidth from the received signal received by the antenna; and the demodulation circuit 110 which demodulates the received signal passed through the variable bandpass filter and outputs it as an ultimate output signal, with which: the S/N ratio measurement circuit calculates the S/N ratio of the output signal when one of a plurality of parameters stored in advance in the frequency characteristic table regarding the frequencies and the bandwidths passing the variable bandpass filter is applied to the variable bandpass filter (FIG. 3, step S105); the control unit controls the S/N ratio measurement circuit to calculate the S/N ratios for all of the plurality of parameters (FIG. 3, steps S106 to 108); and the control unit sets, to the variable bandpass filter, the parameter with which the best S/N ratio among those can be acquired (FIG. 3, step S109).

Further, the control unit includes a plurality of operation modes with different bandwidths, and sets a first operation mode with a wider width than the bandwidth to the variable bandpass filter (FIG. 3, step S101), controls the S/N ratio measurement circuit to calculate the S/N ratios (FIG. 3, step S105), and sets, to the variable bandpass filter, a second operation mode with a width narrower than the bandwidth to operate with the parameter with which the best S/N ratio among those can be acquired (FIG. 3, steps S106 to 109).

Further, in a previous stage of the processing for calculating the S/N ratios of the output signals (FIG. 3, step S105), the power spectrum measurement circuit normalizes the frequency band of the output signals in the first operation mode and outputs it to the S/N ratio measurement circuit (FIG. 3, steps S102 to 103).

Further, the radio reception circuit includes: the quadrature demodulation circuit which performs quadrature demodulation on the received signals passed through the variable bandpass filter; the low-pass filter which passes a low frequency side of the quadrature demodulated signals; the A/D converter which performs A/D conversion on the output from the low-pass filter; and the frequency conversion circuit which converts the A/D-converted signals to intermediate frequency signals and output those to the demodulation circuit, and the control unit sets, to the variable bandpass filter and the low-pass filter, the parameter with which the best S/N ratio can be acquired (FIG. 3, steps S106 to 109).

Note here that each of the above-described action steps may be put into a program to be executed by a computer, and the program may be executed by a processor (the control unit 113) provide to the radio reception circuit 10 which directly executes each of the steps. The program may be recorded on a non-transitory recording medium such as a DVD, a CD, a flash memory, or the like. In that case, the program is read out from the recording medium and executed by the computer. Through such actions, the embodiment can provide following effects.

With the embodiment, it is possible to calculate the S/N ratios for all of a plurality of parameters based on the characteristics acquired in actual communication and to set the parameter with which the best S/N ratio among those can be acquired. Thus, regardless of the presence of the large-power signals of the adjacent channels and even when the frequency thereof changes, it is possible to perform communication with the best S/N ratio by corresponding to each occasion.

Figure 11:
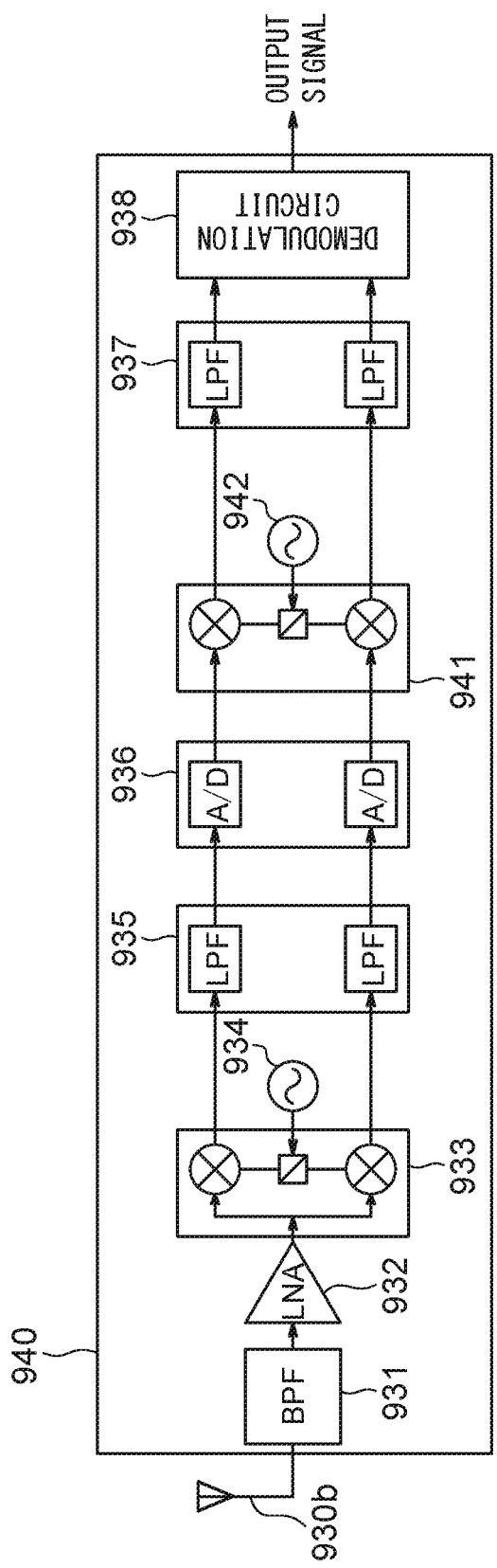
FIG. 11 is an explanatory chart showing structures of a reception circuit that is acquired by partially refining the reception circuit shown in FIG. 10.
Figure 12A:
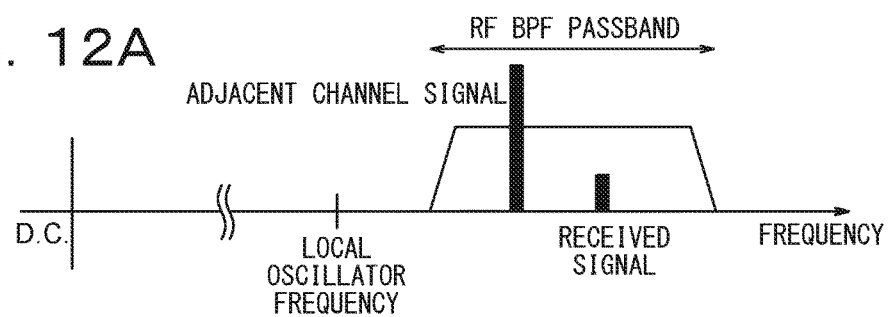
Figure 12B:
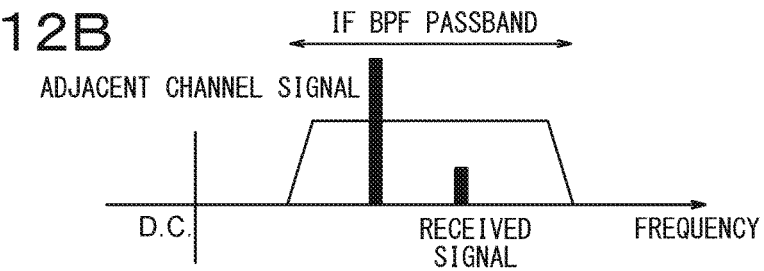
Figure 12C:
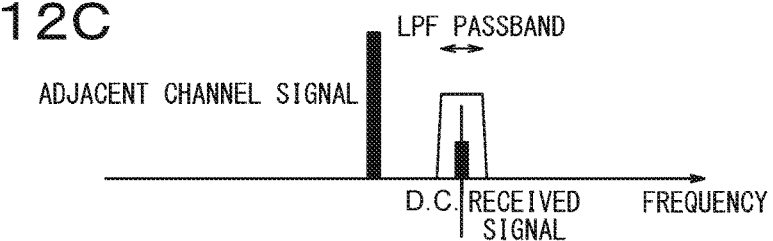
Figure 13A:
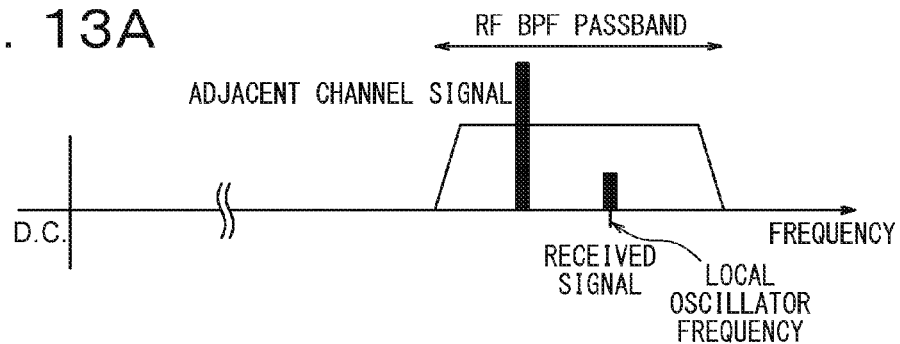
Figure 13B:
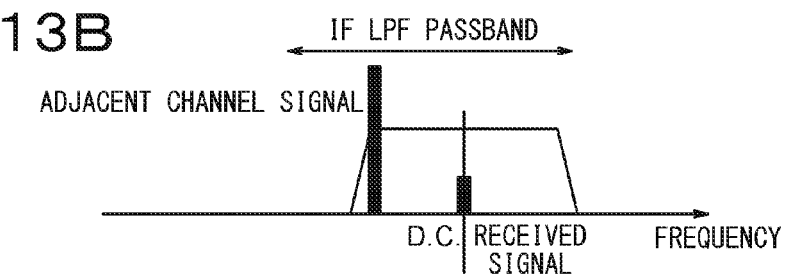
Figure 13C:
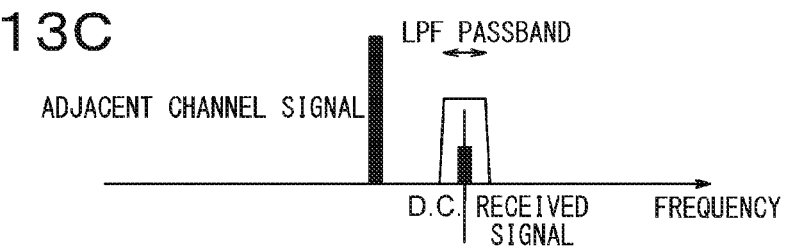

While the embodiment has been described by referring to the case of a partially refined radio reception circuit of the direct conversion type shown in FIG. 11 as an example, this technique can be applied both to the direct conversion type and the super heterodyne type. Further, the power spectrum measurement circuit 111, the S/N ratio measurement circuit 112, and the control unit 113 are not limited to be achieved by the electronic circuits shown in FIG. 8 but may be achieved by arithmetic operations executed on a processor by a computer program.

While the present invention has been described above by referring to the specific embodiment shown in the drawings, the present invention is not limited only to the embodiment described above. Any other known structures can be employed, as long as the effects of the present invention can be achieved therewith.

Regarding the embodiment described above, the new technical contents thereof can be summarized as follows. While a part of or a whole part of the embodiment can be summarized as follows as the new techniques, the present invention is not necessarily limited only to the followings.

(Supplementary Note 1)

A radio reception circuit which demodulates and outputs a received signal received by an antenna, which includes:
- a variable bandpass filter for passing a particular frequency and a particular bandwidth from the received signal and a demodulation circuit for demodulating the received signal passed through the variable bandpass filter and outputting as an ultimate output signal;
- a frequency characteristic table which stores in advance a plurality of kinds of parameters regarding the frequency and the bandwidth for passing through the variable bandpass filter;
- an S/N ratio measurement circuit which calculates an S/N ratio of the output signal in a case where one of the plurality of kinds of parameters is applied to the variable bandpass filter; and
- a control unit which controls the S/N ratio measurement circuit to calculate the S/N ratio for all of the plurality of kinds of parameters and sets, to the variable bandpass filter, the parameter with which a best S/N ratio among those can be acquired.

(Supplementary Note 2)

The radio reception circuit as depicted in Supplementary Note 1, wherein the control unit includes:

a plurality of operation modes with the different bandwidths; and a function which controls the S/N ratio measurement circuit to calculate the S/N ratio after setting, to the variable bandpass filter, a first operation mode with the bandwidth that is wider, and sets a second operation mode with the bandwidth that is narrower to the variable bandpass filter to operate with the parameter with which the best S/N ratio among those can be acquired.

(Supplementary Note 3)

The radio reception circuit as depicted in Supplementary Note 2, which includes:

in a previous stage of the S/N ratio measurement circuit, a power spectrum measurement circuit which normalizes a frequency band of the output signal in the first operation mode and outputs to the S/N ratio measurement circuit.

(Supplementary Note 4)

The radio reception circuit as depicted in Supplementary Note 1, which includes:

a quadrature demodulation circuit which performs quadrature demodulation on the received signal passed through the variable bandpass filter;

a low-pass filter which passes a low frequency side of the quadrature-demodulated signal;

an A/D converter which performs A/D conversion on an output from the low-pass filter; and a frequency conversion circuit which converts the A/D-converted signal to an intermediate frequency signal and outputs to the demodulation circuit.

(Supplementary Note 5)

The radio reception circuit as depicted in Supplementary Note 4, wherein the control unit sets, to the variable bandpass filter and the low-pass filter, the parameter with which the best S/N ratio can be acquired.

(Supplementary Note 6)

A radio reception method used with a radio reception circuit which includes a variable bandpass filter for passing a particular frequency and a particular bandwidth from a received signal received by an antenna and a demodulation circuit for demodulating the received signal passed through the variable bandpass filter and outputting as an ultimate output signal, wherein:

an S/N ratio measurement circuit calculates an S/N ratio of the output signal in a case where one of a plurality of kinds of parameters stored in advance in a frequency characteristic table regarding the frequency and the bandwidth passing through the variable bandpass filter is applied to the variable bandpass filter;

a control unit controls the S/N ratio measurement circuit to calculate the S/N ratios for all of the plurality of kinds of parameters; and the control unit sets, to the variable bandpass filter, the parameter with which a best S/N ratio among those can be acquired.

(Supplementary Note 7)

The radio reception method as depicted in Supplementary Note 6, wherein the control unit includes:

a plurality of operation modes with the different bandwidths; and a function which controls the S/N ratio measurement circuit to calculate the S/N ratio after setting, to the variable bandpass filter, a first operation mode with the bandwidth that is wider, and sets a second operation mode with the bandwidth that is narrower to the variable bandpass filter to operate with the parameter with which the best S/N ratio among those can be acquired.

(Supplementary Note 8)

The radio reception method as depicted in Supplementary Note 7, wherein:

in a previous stage of processing for calculating the S/N ratio of the output signal, a power spectrum measurement circuit normalizes a frequency band of the output signal in the first operation mode and outputs to the S/N ratio measurement circuit.

(Supplementary Note 9)

The radio reception method as depicted in Supplementary Note 6, wherein:

the radio reception circuit includes a quadrature demodulation circuit which performs quadrature demodulation on the received signal passed through the variable bandpass filter, a low-pass filter which passes a low frequency side of the quadrature-demodulated signal, an A/D converter which performs A/D conversion on an output from the low-pass filter, and a frequency conversion circuit which converts the A/D-converted signal to an intermediate frequency signal and outputs to the demodulation circuit; and the control unit sets, to the variable bandpass filter and the low-pass filter, the parameter with which the best S/N ratio can be acquired.

(Supplementary Note 10)

A radio reception program used in a radio reception circuit which includes a variable bandpass filter for passing a particular frequency and a particular bandwidth from a received signal received by an antenna and a demodulation circuit for demodulating the received signal passed through the variable bandpass filter and outputting as an ultimate output signal, and the program causes a processor provided to the radio reception circuit to execute:

a procedure for calculating an S/N ratio of the output signal in a case where one of a plurality of kinds of parameters stored in advance in a frequency characteristic table regarding the frequency and the bandwidth passing through the variable bandpass filter is applied to the variable bandpass filter;

a procedure for repeating calculation of the S/N ratio for all of the plurality of kinds of parameters; and a procedure for setting, to the variable bandpass filter, the parameter with which a best S/N ratio among those can be acquired.

(Supplementary Note 11)

The radio reception program as depicted in Supplementary Note 10, wherein:

the radio reception circuit includes a plurality of operation modes with the different bandwidths, and executes a procedure to control the S/N ratio measurement circuit to calculate the S/N ratio after setting, to the variable bandpass filter, a first operation mode with the bandwidth that is wider; and executes a procedure to set a second operation mode with the bandwidth that is narrower to the variable bandpass filter to operate with the parameter with which the best S/N ratio among those can be acquired.

(Supplementary Note 12)

The radio reception program as depicted in Supplementary Note 11, which executes:

in a previous stage of a procedure for calculating the S/N ratio of the output signal, a procedure for normalizing a frequency band of the output signal in the first operation mode and outputting to the S/N ratio measurement circuit by a power spectrum measurement circuit.

(Supplementary Note 13)

The radio reception program as depicted in Supplementary Note 10, wherein:

the radio reception circuit includes a quadrature demodulation circuit which performs quadrature demodulation on the received signal passed through the variable bandpass filter, a low-pass filter which passes a low frequency side of the quadrature-demodulated signal, an A/D converter which performs A/D conversion on an output from the low-pass filter, and a frequency conversion circuit which converts the A/D-converted signal to an intermediate frequency signal and outputs to the demodulation circuit; and the parameter with which the best S/N ratio can be acquired is set to the variable bandpass filter and the low-pass filter.

This Application claims the Priority right based on Japanese Patent Application No. 2013-147238 filed on Jul. 16, 2013 and the disclosure thereof is hereby incorporated by reference in its entirety.

INDUSTRIAL APPLICABILITY

The present invention can be applied to a radio signal processing circuit loaded on a radio device. Especially, it is suited for digital communication of multiple channels.

REFERENCE NUMERALS 1, 10 Radio reception circuit
1a, 11 Antenna
2, 101 Variable bandpass filter
3, 110 Demodulation circuit
4, 114 Frequency characteristic table
5, 112 S/N ratio measurement circuit
6, 113 Control unit
102 Low-noise amplifier
103 Quadrature demodulation circuit
104 Local oscillator
105, 109 Low-pass filter
106 A/D converter
107 Frequency conversion circuit
108 Numerical value control oscillator
111 Power spectrum measurement circuit
201 FFT calculation circuit
202 Power calculation circuit
203 Normalizing circuit
211 Primary data storing memory
212 Multiplier
213, 215 Adder
214, 216, 223 Register
217 Divider
221 Comparator
222 Selector
224 Controller

What is claimed is:

1. A radio reception circuit which demodulates and outputs a received signal received by an antenna, comprising:

a variable bandpass filter for passing a particular frequency and a particular bandwidth from the received signal and a demodulation circuit for demodulating the received signal passed through the variable bandpass filter and outputting as an ultimate output signal;

a frequency characteristic table which stores in advance a plurality of kinds of parameters regarding the frequency and the bandwidth for passing through the variable bandpass filter;

an S/N ratio measurement circuit which calculates an S/N ratio of the output signal in a case where one of the plurality of kinds of parameters is applied to the variable bandpass filter; and a control unit which controls the S/N ratio measurement circuit to calculate the S/N ratio for all of the plurality of kinds of parameters and sets, to the variable bandpass filter, the parameter with which a maximum S/N ratio among those can be acquired, wherein the control unit comprises:

a plurality of operation modes with the different bandwidths; and a function which controls the S/N ratio measurement circuit to calculate the S/N ratio after setting, to the variable bandpass filter, a first operation mode with the bandwidth that is wider, and sets a second operation mode with the bandwidth that is narrower to the variable bandpass filter to operate with the parameter with which the maximum S/N ratio among those can be acquired.

2. The radio reception circuit as claimed in claim 1, comprising:

in a previous stage of the S/N ratio measurement circuit, a power spectrum measurement circuit which normalizes a frequency band of the output signal in the first operation mode and outputs to the S/N ratio measurement circuit.

3. A radio reception circuit which demodulates and outputs a received signal received by an antenna, comprising:

a variable bandpass filter for passing a particular frequency and a particular bandwidth from the received signal and a demodulation circuit for demodulating the received signal passed through the variable bandpass filter and outputting as an ultimate output signal;

a frequency characteristic table which stores in advance a plurality of kinds of parameters regarding the frequency and the bandwidth for passing through the variable bandpass filter;

an S/N ratio measurement circuit which calculates an S/N ratio of the output signal in a case where one of the plurality of kinds of parameters is applied to the variable bandpass filter;

a control unit which controls the S/N ratio measurement circuit to calculate the S/N ratio for all of the plurality of kinds of parameters and sets, to the variable bandpass filter, the parameter with which a maximum S/N ratio among those can be acquired;

a quadrature demodulation circuit which performs quadrature demodulation on the received signal passed through the variable bandpass filter;

a low-pass filter which passes a low frequency side of the quadrature-demodulated signal;

an A/D converter which performs A/D conversion on an output from the low-pass filter; and a frequency conversion circuit which converts the A/D-converted signal to an intermediate frequency signal and outputs to the demodulation circuit.

4. The radio reception circuit as claimed in claim 3, wherein the control unit sets, to the variable bandpass filter and the low-pass filter, the parameter with which the maximum S/N ratio can be acquired.

5. A radio reception method used with a radio reception circuit which comprises a variable bandpass filter for passing a particular frequency and a particular bandwidth from a received signal received by an antenna and a demodulation circuit for demodulating the received signal passed through the variable bandpass filter and outputting as an ultimate output signal, wherein:

an S/N ratio measurement circuit calculates an S/N ratio of the output signal in a case where one of a plurality of kinds of parameters stored in advance in a frequency characteristic table regarding the frequency and the bandwidth passing through the variable bandpass filter is applied to the variable bandpass filter;

a control unit controls the S/N ratio measurement circuit to calculate the S/N ratios for all of the plurality of kinds of parameters;

the control unit sets, to the variable bandpass filter, the parameter with which a maximum S/N ratio among those can be acquired, wherein the control unit comprises:

a plurality of operation modes with the different bandwidths; and a function which controls the S/N ratio measurement circuit to calculate the S/N ratio after setting, to the variable bandpass filter, a first operation mode with the bandwidth that is wider, and sets a second operation mode with the bandwidth that is narrower to the variable bandpass filter to operate with the parameter with which the maximum S/N ratio among those can be acquired.

6. The radio reception method as claimed in claim 5, wherein:

in a previous stage of processing for calculating the S/N ratio of the output signal, a power spectrum measurement circuit normalizes a frequency band of the output signal in the first operation mode and outputs to the S/N ratio measurement circuit.

7. A radio reception method used with a radio reception circuit which comprises a variable bandpass filter for passing a particular frequency and a particular bandwidth from a received signal received by an antenna and a demodulation circuit for demodulating the received signal passed through the variable bandpass filter and outputting as an ultimate output signal, wherein:

an S/N ratio measurement circuit calculates an S/N ratio of the output signal in a case where one of a plurality of kinds of parameters stored in advance in a frequency characteristic table regarding the frequency and the bandwidth passing through the variable bandpass filter is applied to the variable bandpass filter;

a control unit controls the S/N ratio measurement circuit to calculate the S/N ratios for all of the plurality of kinds of parameters; and the control unit sets, to the variable bandpass filter, the parameter with which a maximum S/N ratio among those can be acquired, wherein the radio reception circuit comprises a quadrature demodulation circuit which performs quadrature demodulation on the received signal passed through the variable bandpass filter, a low-pass filter which passes a low frequency side of the quadrature-demodulated signal, an A/D converter which performs A/D conversion on an output from the low-pass filter, and a frequency conversion circuit which converts the A/D-converted signal to an intermediate frequency signal and outputs to the demodulation circuit; and the control unit sets, to the variable bandpass filter and the low-pass filter, the parameter with which the maximum S/N ratio can be acquired.

8. A non-transitory computer readable recording medium storing a radio reception program used in a radio reception circuit which includes a plurality of operation modes with the different bandwidths and comprises a variable bandpass filter for passing a particular frequency and a particular bandwidth from a received signal received by an antenna and a demodulation circuit for demodulating the received signal passed through the variable bandpass filter and outputting as an ultimate output signal, the program causing a processor provided to the radio reception circuit to execute:

a procedure for calculating an S/N ratio of the output signal in a case where one of a plurality of kinds of parameters stored in advance in a frequency characteristic table regarding the frequency and the bandwidth passing through the variable bandpass filter is applied to the variable bandpass filter;

a procedure for repeating calculation of the S/N ratio for all of the plurality of kinds of parameters;

a procedure for setting, to the variable bandpass filter, the parameter with which a maximum S/N ratio among those can be acquired;

a procedure to calculate the S/N ratio after setting, to the variable bandpass filter, a first operation mode with the bandwidth that is wider; and a procedure to set a second operation mode with the bandwidth that is narrower to the variable bandpass filter to operate with the parameter with which the maximum S/N ratio among those can be acquired.

9. A non-transitory computer readable recording medium storing a radio reception program used in a radio reception circuit which comprises: a variable bandpass filter for passing a particular frequency and a particular bandwidth from a received signal received by an antenna; a demodulation circuit for demodulating the received signal passed through the variable bandpass filter and outputting as an ultimate output signal; a quadrature demodulation circuit which performs quadrature demodulation on the received signal passed through the variable bandpass filter; a low-pass filter which passes a low frequency side of the quadrature-demodulated signal; an A/D converter which performs A/D conversion on an output from the low-pass filter; and a frequency conversion circuit which converts the A/D-converted signal to an intermediate frequency signal and outputs to the demodulation circuit, the program causing a processor provided to the radio reception circuit to execute:

a procedure for calculating an S/N ratio of the output signal in a case where one of a plurality of kinds of parameters stored in advance in a frequency characteristic table regarding the frequency and the bandwidth passing through the variable bandpass filter is applied to the variable bandpass filter;

a procedure for repeating calculation of the S/N ratio for all of the plurality of kinds of parameters;

a procedure for setting, to the variable bandpass filter, the parameter with which a maximum S/N ratio among those can be acquired; and a procedure for setting, to the variable bandpass filter and the low-pass filter, the parameter with which the maximum S/N ratio can be acquired.

* * * * *